Nov. 29, 1960     E. LUDLOW ET AL     2,962,409
COMPOSITE STRUCTURE AND METHOD OF MAKING IT
Filed Aug. 12, 1957     2 Sheets-Sheet 1
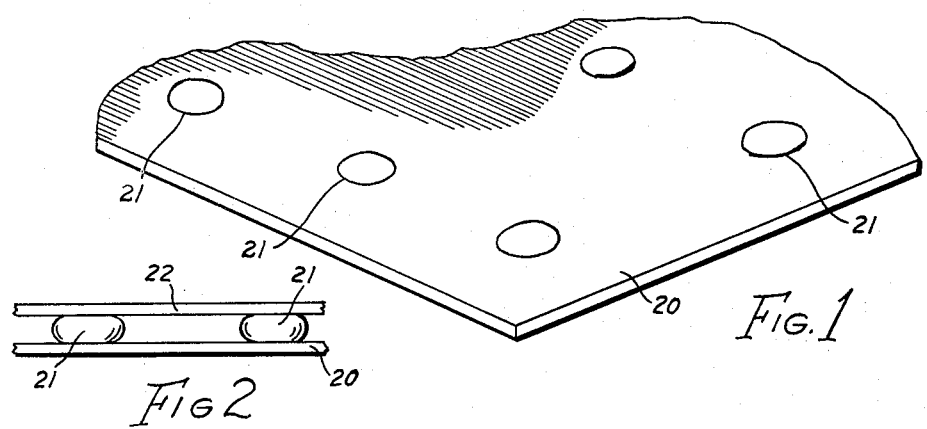
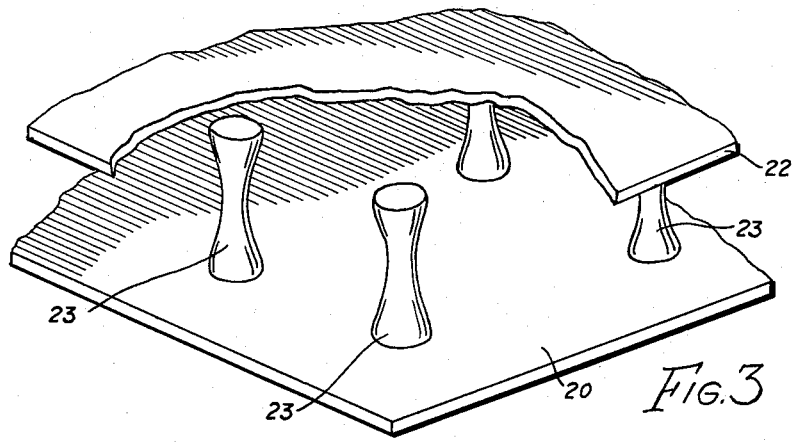
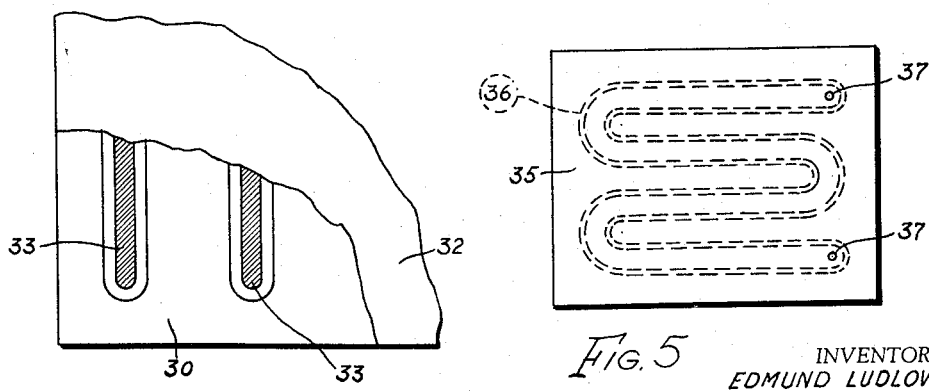
INVENTORS
EDMUND LUDLOW
GLENN E. WINTERMUTE
BY
ATTORNEYS

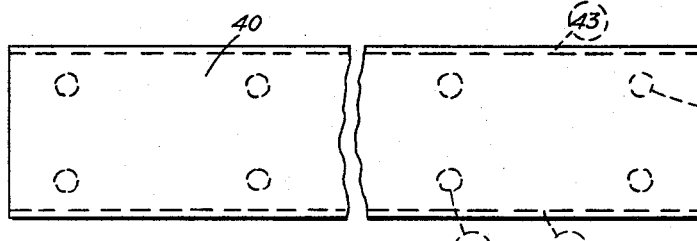
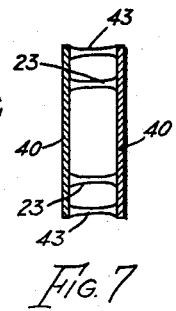
Fig. 6   Fig. 7
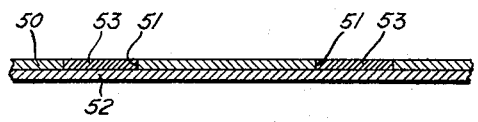
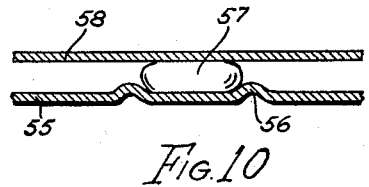
Fig. 8   Fig. 10
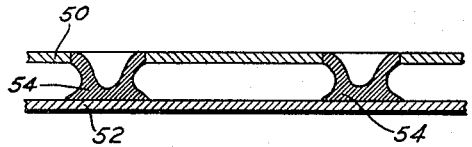
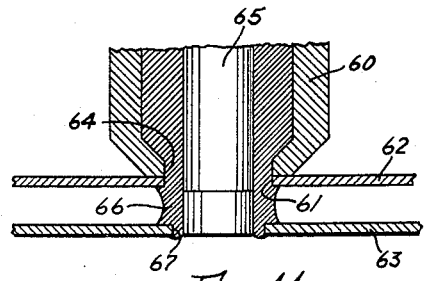
Fig. 9   Fig. 11
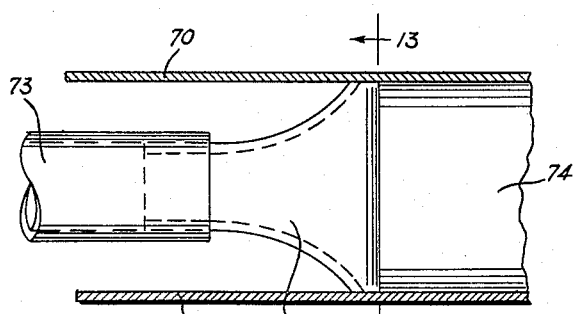
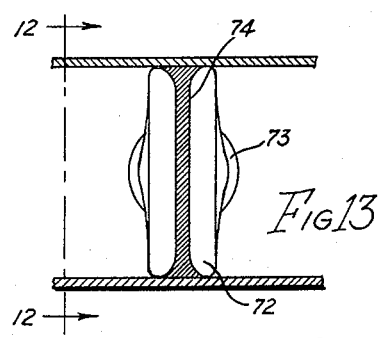
Fig. 12   Fig. 13
INVENTOR.
EDMUND LUDLOW
GLENN E. WINTERMUTH
BY
ATTORNEYS

2,962,409

COMPOSITE STRUCTURE AND METHOD OF MAKING IT

Edmund Ludlow and Glenn E. Wintermute, Columbus, Ind., assignors to Arvin Industries, Inc., Columbus, Ind., a corporation of Indiana Filed Aug. 12, 1957, Ser. No. 677,605

8 Claims. (Cl. 154—122)

This invention relates to a composite structure of the type comprising a pair of sheets and an interposed spacing means, and to a method of producing such a structure. Prior structures of this general type have commonly embodied a cellular core, such as one of paper or similar material formed into a honeycomb pattern, bonded to and between sheets of relatively thin metal or the like. Such structures are characterized by low weight and by high strength and rigidity, and can be manufactured relatively inexpensively. However, they have certain limitations in respect to form and the process of their manufacture involves some difficulties.

Our invention is characterized in that the core, instead of being formed as a separate element and then interposed between and bonded to the sheets, is formed in place, of a semi-fluid material which can subsequently be set into a more or less rigid state. The core material is preferably a synthetic resin, either a thermosetting resin semifluid in its original state or a thermoplastic resin softened by heating. In general, three methods of employing such a material to form a core are contemplated. In the first method, the core-forming material is distributed on one of the sheets as discrete masses or gobs, in lines, or in any other desired pattern, the second sheet is laid on the distributed material, light pressure is applied to cause the core-forming material to adhere to both sheets, and the sheets are then separated to the desired spacing, the core-forming material drawing out to form pillars or webs extending between and interconnecting the sheets. In the second method, one of the sheets is provided with holes corresponding in shape, size, and position to the desired core pattern, the sheets are superposed, core-forming material is forced through the holes, and a gradual separation of the sheets is begun, additional core-forming material being introduced through the holes as the separation progresses. In the third method, the two sheets are supported in spaced relation and the coreforming material is introduced to form webs or pillars interconnecting the sheets. In the last method, the core-forming material may be introduced through a nozzle interposed between the sheets or alternatively one sheet may be provided with openings through which such material is introduced. As a final step in any of the methods described, the core-forming material is set to the desired degree of rigidity.

Further objects and features of the invention will become apparent from the more detailed description which follows, and from the accompanying drawings, in which:

Fig. 1 is a fragmental isometric view illustrating one of the sheets with the core-forming material distributed on it as discrete gobs;

Fig. 2 is an elevation showing the second sheet superposed on the core-forming material;

Fig. 3 is a fragmental isometric view with a portion of the upper plate broken away showing the finished structure after separation of the plates shown in Fig. 2;

Fig. 4 is a fragmental plan view, in partial section, showing the structure produced when the core-forming material is laid down in parallel lines rather than as discrete gobs;

Fig. 5 is a plan view of a structure formed in accordance with our invention and constituting a heat-exchanger;

Fig. 6 is a plan view of a duct formed in accordance with our invention;

Fig. 7 is an end elevation of the duct of Fig. 6;

Fig. 8 is a fragmental section illustrating a modified method of applying the core-forming material;

Fig. 9 is a fragmental section showing the sheets of Fig. 8 in separated condition;

Fig. 10 is a fragmental section illustrating still another way in which the core-forming material may be located on one of the sheets;

Fig. 11 is a fragmental section illustrating the structure and operation of means for supplying additional core-forming material to each body thereof as the sheets are separated;

Fig. 12 is a section on the line 12—12 of Fig. 13 showing means for applying core-forming material to sheets already separated; and Fig. 13 is a section on the line 13—13 of Fig. 12.

In Fig. 1 of the drawings we have shown a sheet 20 on which a plurality of discrete gobs 21 of core-forming material in semi-fluid state have been distributed at predetermined spaced intervals. When a second sheet 22 is laid on the gobs 21 and pressed downward lightly (Fig. 2), the gobs 21 will be caused to adhere to both sheets, so that when the sheets are separated each gob will be drawn out to form a pillar 23 having its ends bonded to the sheets 20 and 22 respectively. Upon solidification of the core-forming material, a rigid, strong, light-weight panel results.

The sheets 20 and 22 are preferably of metal, but they may be of any other appropriate material, such as a plastic, hardboard, plywood, etc. The two sheets may be of the same material or of different materials.

The core-forming material may vary widely, but we prefer to use a synthetic resin, either thermosetting or thermoplastic. Suitable thermosetting resins include phenolic, epoxy, polyester, and urethane resins. As applied they have a consistency which can be described as dough-like, being sufficiently viscous that they do not flow unduly even under the pressure applied to effect their adherence to the sheets and sufficiently fluid to stretch and form the pillars 23 as the sheets are separated. The resin employed may be one which can be heat-cured or one which incorporates a catalyst or is otherwise so constituted that it will cure at room temperature. Desirably, the resin should not suffer any marked decrease in viscosity under curing conditions, as otherwise surface tension might cause undue necking or even rupture of the pillars. Rapidity of cure is desirable, in order to expedite and lessen the cost of production. The resin desirably is one which adheres well to the surface of the sheets; but if necessary to obtain the desired adherence, the opposed faces of the sheets could be coated with an apppropriate adhesive. To increase strength and/or to provide the desired viscosity fillers such as glass fibers or metal powders may be mixed with the resin.

One themosetting core-forming material we have employed with satisfactory results had the following composition;

| | Parts |
|---|---|
| Epoxy resin (Shell Chemical Company's "Epon 828") | 100 |
| Powdered aluminum | 30 |
| Catalyst (Shell Chemical Company's curing agent "D") | 13 |

The above composition has a dough-like consistency and can be distributed on the sheet 20 in the form of relatively stable gobs 21. The size of such gobs will depend on the final distance between the sheets, and both their size and spacing will depend on the strength and rigidity desired for the finished structure. Gobs we have used have varied from about ¼ inch in diameter by ¼ inch in thickness to one inch in diameter and one inch in thickness, the former being suitable for sheet-spacings on the order of one-half inch and the latter for sheet-spacings on the order of 2½ inches.

Thermoplastic resins, such as vinyls, acrylics, polystyrenes, and cellulosics, can be used for the core-forming material. Such resins, solid at ordinary temperatures, are softened to a dough-like consistency by heat, are distributed on the sheet 20, the sheet 22 is applied, the sheets are separated to draw the gobs 21 into the pillars 23, and the product cooled to solidify the resin.

It will be understood that whatever core-forming material is used, the two sheets 20 and 22 will be maintained at the desired spacing in any appropriate manner as such material sets. Setting of thermoplastic resins can be effected by cooling, as above indicated; while the thermosetting resins can be cured by heat, applied from outside, as in an oven, or generated within the material by dielectric heating. In the latter case, the sheets 20 and 22, if electroconductive, may serve as the electrodes.

Instead of depositing the core-forming material as discrete gobs on one of the sheets, it may be laid down in extended ridges. Such a procedure, for example, results in the structure of Fig. 4, where two plates 30 and 32 are interconnected by a plurality of spaced webs 33 each formed by the drawing out of a ridge of core-forming material as the two sheets are separated. If the ridges are laid down in an intersecting rather than in the parallel arrangement from which the structure of Fig. 4 was produced, the webs formed on separation of the plates would intersect to produce a cellular core.

Webs formed by the drawing out of ridges of material can be employed in cooperation with the sheets to define fluid passages. Thus, in Fig. 5 we have shown a heat-exchanger comprising a pair of spaced plates 35 between which there extends a continuous web 36 so shaped as to define a retroverted fluid passage interconnecting inlet and outlet openings 37 in one of the plates. By laying down parallel, spaced ridges along the edges of strip stock, superposing a second strip, and separating the strips a duct such as is shown in Figs. 6 and 7 may be made. In that figure, the two strips indicated at 40 are joined through the medium of two webs 43 formed by separating the two strips while they adhere to ridges of semi-fluid core-forming material extending along their side edges. To provide support against deformation resulting from either exterior or interior pressures, pillars 23 extending between the strips 40 may be formed simultaneously with the webs from discrete gobs of material laid down at appropriate intervals between the webs.

It may be desirable in some instances to so form the sheets as to define the location, shape, and size of the deposited bodies of core-forming material. One such arrangement is illustrated in Figs. 8 and 9, where a sheet 50 containing perforations 51 is superposed on another sheet 52 and the perforations are filled with bodies 53 of core-forming material. When the sheets are separated with the material still in semi-fluid state, the bodies 53 will be drawn out into pillars or webs 54. This method is especially well suited to structure in which the spacing of the sheets is not too great relative to the thickness of the perforated sheet. The perforations 51 may take any desired form, such as round holes or elongated slots, depending on the core-form desired.

Another method of forming the sheets to define and locate the core elements is shown in Fig. 10. Here, the sheet 55 is formed to provide upwardly projecting ribs or beads 56 defining depressions or pockets each adapted to receive a body 57 of core-forming material. Such depressions, which may have any desired form and distribution, receive core material to a depth somewhat greater than the height of the ribs 56, so that when the second sheet 58 is superposed it will engage and adhere to the bodies 57 so that the latter will be drawn out to form pillars or webs when the sheets are separated.

Drawing out of the bodies of core-forming material as the sheets are separated tends to cause them to neck. Such necking tendency can be controlled to an extent by proper regulation of the viscosity of the core-forming material, increases in viscosity reducing the tendency to neck. Necking can also be reduced, in the case of gobs, by giving them the general form of an oblate spheroid, and, in the case of ridges, by forming them of elliptical cross-section, in both cases the maximum diameters running parallel to the plates. More accurate control of the diameter or thickness of a body of core-forming material as it is drawn out in separation of the plates can be provided through the use of apparatus of the type shown in Fig. 11. Such apparatus comprises a nozzle 60 adapted to seat around an opening 61 in a plate 62 which is superposed on a second plate 63. The orifice 64 of the nozzle is preferably about the same size as the opening 61, although it may be somewhat larger. The nozzle is connected to means (not shown) for supplying core-forming material under appropriate pressure; and as the sheets are separated, the core-forming material is discharged or extruded from the nozzle at a controlled rate. In this manner a pillar or web of substantially uniform cross-section can be produced. As shown, the nozzle 60 is provided with a central plug 65, so that the orifice 64 will be annular and the pillar 66 formed as the sheets separate will be hollow.

In another method of using the apparatus of Fig. 11, the sheets 62 and 63 are supported in spaced relation and the core-forming material is extruded through the nozzle 60 and opening 61 until it bridges the span between the sheets and adheres to both.

In either use of the apparatus of Fig. 11, passages extending completely through the composite structure can be formed by providing the lower sheet 63 with openings 67 aligned respectively with the openings 61 in the upper sheet and, through the use of a plug 65, extruding the core forming material as a tube.

In Figs. 12 and 13 we have illustrated another method in which a core may be formed between sheets which are supported in predetermined spaced relation. As there shown, two sheets 70 and 71 are supported in spaced relation and a nozzle 72 mounted in the end of a tube or pipe 73 is introduced between the sheets. The nozzle is connected to a source of core-forming material under pressure and has an elongated discharge orifice the length of which equals the distance between the sheets 70 and 71. With the sheets supported at the proper spacing, the pipe 73 is passed between them to position the nozzle orifice at the point where a web is to start; and, as the core-forming material is discharged, the pipe is withdrawn leaving the discharged material forming a web 74 extending between and adhering to the two sheets.

Where the core-forming material is introduced between sheets maintained in spaced relation, as in Figs. 12 and 13 and in the second method disclosed above for use of the apparatus of Fig. 11, it is not essential that the sheet-spacing maintained during introduction of the material be that desired in the final structure. Thus, after the webs or pillars have been formed, but before the core-forming material has been set, the spacing between the sheets can be increased or decreased, with accompanying attenuation or thickening of the webs or pillars.

One of the important advantages of our invention is that it is not limited to structures in which the spaced skins or sheets are plane or to structures in which the spacing of the skins is uniform throughout their extent.

It will be understood that the specific embodiments of the invention illustrated and described are set forth merely

We claim as our invention:

1. A method of making a composite structure comprising two spaced, opposed sheets and a rigid means located between the sheets and bonded to their opposed faces for interconnecting them, comprising the steps of distributing a settable plastic material on one of said sheets in a predetermined pattern, superimposing the other sheet on said settable plastic material and forcing it into bonding contact therewith, moving said sheets apart into a predetermined spaced relationship wherein the settable plastic material is drawn out, and setting said material into a rigid state while maintaining the sheets in said predetermined spaced relationship.

2. A method according to claim 1 wherein the settable material is distributed as spaced, discrete masses which, when drawn out in separation of the sheets form pillars.

3. A method according to claim 1 wherein the settable material is distributed as spaced ridges which, when drawn out in separation of the sheets form elongated webs.

4. A method according to claim 1 wherein the settable material is distributed as spaced generally parallel ridges which, when drawn out in separation of the sheets form elongated webs cooperating with the sheets to define a conduit.

5. A method of making a composite structure comprising two spaced, opposed sheets and a rigid means located between the sheets and bonded to their opposed faces for interconnecting them, comprising the steps of distributing a settable plastic material on one of said sheets in a predetermined pattern through openings in the other of said sheets to dispose said settable plastic material in bonding contact with the opposed faces of both of said sheets, disposing said sheets in a predetermined relationship wherein the sheets are spaced apart by a distance at least equal to that existing when said plastic material was first brought in contact with them, and setting said material into a rigid state while maintaining the sheets in said predetermined spaced relationship.

6. A method according to claim 5 wherein the settable material introduced through each sheet opening is an extended annulus forming a hollow pillar bonded to and interconnecting said sheets.

7. A method according to claim 5 wherein said one sheet is provided with openings disposed in alignment with the openings in said other sheet and said settable material is introduced therethrough in the form of extended annuli to form a plurality of passage-forming tubes bonded to and interconnecting the sheets and open at opposite faces of the structure.

8. A method of making a composite structure comprising two spaced, opposed sheets and a rigid means located between the sheets and bonded to their opposed faces for interconnecting them, comprising the steps of distributing a settable plastic material on one of said sheets in a predetermined pattern in spaced depressions formed in said sheet, said settable material projecting above the depressions, superimposing the other sheet on said settable material and forcing it into bonding contact therewith, disposing said sheets in a predetermined relationship wherein the sheets are spaced apart by a distance at least equal to that existing when said plastic material was first brought in contact with them, and setting said material into a rigid state while maintaining the sheets in said predetermined spaced relationship.

References Cited in the file of this patent

UNITED STATES PATENTS

| | | |
|---|---|---|
| 1,565,532 | Tupper | Dec. 15, 1925 |
| 2,151,597 | Hamilton | Mar. 21, 1939 |
| 2,276,363 | Zalkind | Mar. 17, 1942 |
| 2,300,488 | Cuno | Nov. 3, 1942 |
| 2,350,887 | Goff | June 6, 1944 |
| 2,411,328 | MacNab | Nov. 19, 1946 |
| 2,502,304 | Baker | Mar. 28, 1950 |
| 2,610,937 | Frink et al. | Sept. 16, 1952 |
| 2,685,813 | Lampman et al. | Aug. 10, 1954 |
| 2,714,750 | Facciolo | Aug. 9, 1955 |
| 2,744,846 | Stickles | May 8, 1956 |
| 2,789,076 | Frieder et al. | Apr. 16, 1957 |